(No Model.)
W. HOLZER.
ELECTRIC LAMP.
No. 264,698. Patented Sept. 19, 1882.
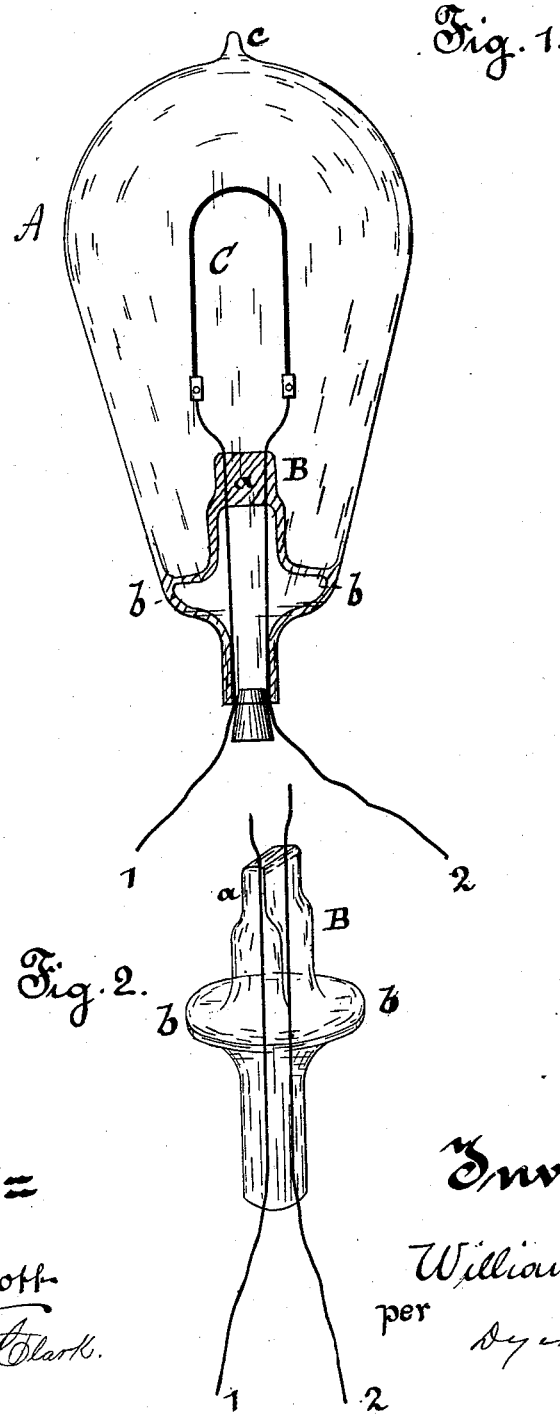

UNITED STATES PATENT OFFICE.

WILLIAM HOLZER, OF MENLO PARK, N. J., ASSIGNOR, BY MESNE ASSIGNMENTS, TO THE EDISON ELECTRIC LIGHT COMPANY, OF NEW YORK, N. Y.

ELECTRIC LAMP.

SPECIFICATION forming part of Letters Patent No. 264,698, dated September 19, 1882.

Application filed November 28, 1881. Renewed August 14, 1882. (No model.)

*To all whom it may concern:*

Be it known that I, WILLIAM HOLZER, of Menlo Park, in the county of Middlesex and State of New Jersey, have invented a new and useful Improvement in Electric Lamps; and I do hereby declare that the following is a full and exact description of the same, reference being had to the accompanying drawings, and to the letters of reference marked thereon.

My invention relates to those incandescent electric lamps in which the incandescent conductor is inclosed in a hermetically-sealed vacuum-chamber made entirely of glass, and it is intended as an improvement on the lamps described in the patents of Thomas A. Edison, Nos. 230,255 and 239,149. These lamps are made in two parts—the exterior inclosing globe and an interior stem, which enters said globe and acts as a support for the wires which convey the electric current to and from the incandescing conductor. The interior stem is a tube of glass, in which the wires are laid, the inner end of the tube being closed and the wires passing through and being sealed into the glass which closes it.

In the above-mentioned patents the inner end of the tube is formed into a spherical, or nearly spherical, bulb, through the glass of which the wires pass. They are thus in contact with the glass for a very small portion only of their length—equal to the thickness of the glass.

I have found it desirable to increase the extent of this contact with the glass, in order to lessen the liability of cracking at the point of contact between the wire and glass, and to hold the wires more firmly in place. To do this, after the wires are passed through the tube I heat the inner end of the latter to a welding heat and then press the end together upon the wires, so that a small flat piece is produced, within which the wires are firmly held, they being in contact with the glass throughout the entire length of the flat portion of the tube. This may be better understood by reference to the annexed drawings, in which—

Figure 1 is a view partly in elevation and partly in section of an entire lamp containing my invention, and Fig. 2 is a view of the interior glass stem or wire-support.

A is the inclosing globe or vacuum-chamber, made of glass; and B, the interior stem or wire-support, which is made from a hollow tube of glass, open at both ends. In such a tube the copper conducting-wires 1 2 are laid, a bulb having been previously blown at *b b* to form a shoulder to which the globe is to be secured. The upper end of B is then heated by a blowpipe flame to a welding condition, when its sides are compressed and welded together by means of any suitable instrument, so that a solid flat portion, *a*, is formed around the wires 1 2. The incandescing conductor C is then attached, in any suitable manner, to the wires 1 2, after which the stem B is introduced into the globe A, and the two are sealed together at the points *b b* by the fusion of the glass. The lamp is exhausted and sealed off at *c*, and is then ready for use.

What I claim is—

1. In an incandescing electric lamp, the central tube or support formed with a solid flat portion at its upper extremity, through which the leading-in conductors pass and in which they are sealed, substantially as set forth.

2. The method of sealing the leading-in conductors into the central tubular carbon-support of an incandescing electric lamp, consisting in squeezing the open upper end of the tube upon such conductors, and at the same time closing air-tight such end of the tube, substantially as set forth.

This specification signed and witnessed this 27th day of September, 1881.

WILLIAM HOLZER.

Witnesses:
RICHD. N. DYER,
H. W. SEELY.